(12) United States Patent
Bendiner

(10) Patent No.: US 6,500,360 B2
(45) Date of Patent: Dec. 31, 2002

(54) SORBIC ACID AND/OR ITS DERIVATIVES, SUCH AS POTASSIUM SORBATE, AS A PREVENTATIVE FOR RUST, CORROSION AND SCALE ON METAL SURFACES

(76) Inventor: Bernard Bendiner, P.O. Box 9088, Michigan City, IN (US) 46361

( * ) Notice: Subject to any disclaimer, the term of this patent is extended or adjusted under 35 U.S.C. 154(b) by 0 days.

(21) Appl. No.: 09/751,648

(22) Filed: Dec. 29, 2000

(65) Prior Publication Data

US 2001/0000619 A1 May 3, 2001

Related U.S. Application Data

(62) Division of application No. 09/336,612, filed on Jun. 18, 1999.

(51) Int. Cl.$^7$ .......................... C23F 11/08; C09K 3/00; C09K 15/32
(52) U.S. Cl. ..................... 252/389.62; 252/400.1; 252/400.62
(58) Field of Search .................. 252/400.1, 400.62

(56) References Cited

U.S. PATENT DOCUMENTS

| | | | | | |
|---|---|---|---|---|---|
| 3,630,226 A | * | 12/1971 | Develter | ............... | 137/575 |
| 4,000,079 A | * | 12/1976 | Rasp et al. | ............... | 252/75 |
| 4,085,063 A | * | 4/1978 | Liu | ............... | 252/387 |
| 4,370,354 A | * | 1/1983 | Leipold | ............... | 426/573 |
| 4,374,174 A | * | 5/1983 | Stricklin et al. | | |
| 4,559,103 A | * | 12/1985 | Nomura et al. | ............... | 162/160 |
| 4,564,465 A | * | 1/1986 | Bibber | ............... | 252/389 R |
| 4,959,176 A | * | 9/1990 | Slocum et al. | ............... | 252/389.53 |
| 4,966,779 A | * | 10/1990 | Kirk | ............... | 426/72 |
| 4,981,678 A | * | 1/1991 | Tomlinson | ............... | 424/25 |
| 5,147,455 A | * | 9/1992 | Watanabe et al. | | |
| 5,151,451 A | * | 9/1992 | Brown et al. | ............... | 514/773 |
| 5,230,730 A | * | 7/1993 | Speckmann et al. | | |
| 5,354,902 A | * | 10/1994 | Merciadez et al. | ............... | 562/601 |
| 5,389,384 A | * | 2/1995 | Jooste | ............... | 424/661 |
| 5,795,372 A | * | 8/1998 | Hill et al. | | |
| 5,925,173 A | * | 7/1999 | Frost et al. | | |
| 5,965,549 A | * | 10/1999 | Purwar et al. | ............... | 514/177 |
| 6,027,687 A | * | 2/2000 | Nakajima et al. | ............... | 423/13 |
| 6,190,611 B1 | * | 2/2001 | Tachino et al. | ............... | 422/61 |

* cited by examiner

Primary Examiner—Margaret Medley
(74) Attorney, Agent, or Firm—Brinks Hofer Gilson & Lione

(57) ABSTRACT

An aqueous solution that will prevent rust, corrosion and scale on metal surfaces that includes potassium sorbate at percentages above 0.3%. This aqueous solution is effective at pH 4.5. However, its optimum effectiveness as a rust preventive is at pH 6.0 and above. The solution can be produced in a concentrated form and then diluted with tap or deionized water. The potassium sorbate solution has reduced conductivity and reduced oxygen content, both relative to tap water. This is believed to be the technical basis for its ability to prevent rust. Furthermore, the combination of lower conductivity and reduced oxygen content renders the potassium sorbate solution less viable for microbiological growth which prevents the solution from becoming rancid when it is used in re-circulating water systems. This also permits the use of toxic biocides to be eliminated in re-circulatory water systems, which are often used to reduce and control microbiological growth. Also, the solution can be substituted for tap water in water-based products, such as paints, which eliminates the need to plate the cans.

3 Claims, 9 Drawing Sheets

SORBIC ACID AND/OR ITS DERIVATIVES, SUCH AS POTASSIUM SORBATE, AS A PREVENTATIVE FOR RUST, CORROSION AND SCALE ON METAL SURFACES

This application is a division of application No. 09/336,612, filed Jun. 18, 1999.

FIELD OF THE INVENTION

The invention relates to sorbic acid and its derivative potassium sorbate for use as a preventative against rust, corrosion and scale that usually forms on metal surfaces.

BACKGROUND OF THE INVENTION

Sorbic acid and its salts are commonly used to preserve foods such as cheese, fish, meat, vegetables, fruit, non-alcoholic beverages, wine, confectioneries and baked goods. Sorbic acid and its salts are also used as preservatives in some pharmaceuticals and cosmetics. Potassium sorbate (hereinafter PS) or 2,4 hexadienoic acid potassium salt, is extensively used as a wide spectrum anti-microbial for maintaining freshness in foods, beverages, animal feed, cosmetics and as a preservative for products destined to come in contact with foodstuffs such as adhesives for food packaging. PS has excellent water solubility as compared to sorbic acid which has low water solubility. PS is highly effective against most micro-organisms, is economical and has obtained worldwide approval for use in a wide variety of foods. The concentration of sorbic acid and its salts as a preservative, in food in which the preservative is evenly dispersed, is about 0.1% and generally falls in the range of 0.05% to 0.3%. Some food products are dipped or sprayed with a PS solution that has a concentration of 5–10%, however, the concentration of the preservative in these final products fall within the above range.

The effectiveness of all food preservatives is highly dependent upon the pH of the preservative. The optimum effectiveness of PS as a food preservative is when it is used below pH 6.0. However, it is an effective food preservative at up to pH 6.5 which qualifies PS to be used in a very wide variety of foods.

The major manufacturer of potassium sorbate in the United States is Eastman Chemical in Kingsport, Tenn. The largest manufacturer of PS is Hoechst Celanese of Frankfurt, Germany. There are a limited number of large manufacturers of PS in the world, one being in Japan and another in Denmark.

Although sorbic acid and its salts have been found to be effective against a long list of microorganisms that are responsible for food decay, its use as a rust preventative agent has not been previously recognized. There is currently no known published literature that discloses the use of PS for other than its widespread anti-microbial use, primarily in products directly or indirectly related to food, with some acknowledgement of its anti-microbial effect in unrelated food products, such as cleaning solutions primarily used for cleaning areas involving food, such as food preparation or processing areas.

Corrosion is a very serious problem in many industries. According to an article in McGraw Hill Encyclopedia of Science & Technology, "The cost of corrosion in the United States and other industrial countries has been estimated to be on the order of 4% of the gross national product." This estimated cost includes both the replacement cost and the cost of protecting against corrosion. Extensive efforts have been made in the design of products such as steam generators, heat exchangers, bridges, oil platforms and motor vehicles to minimize the destructive effects of corrosion. However, corrosion remains a problem in these traditional products. In addition to traditional products, new developments in the areas of energy sources, new materials and microprocessors present new challenges in the fight against corrosion. As new devices are developed on a submicrometer scale, even smaller amounts of corrosion will result in device failure.

For these reasons, a new method and product that is effective to prevent and guard against corrosion of metal is needed.

BRIEF SUMMARY OF THE INVENTION

It is the object of the invention to provide an aqueous solution that will prevent rust. The aqueous solution of this invention includes PS in the form of powder or granules that have been dissolved in ordinary tap water or deionized water, at percentages above 0.3%. PS is at its optimum effectiveness as a rust preventive at pH 6.0 and above.

The formula for producing applicant's PS solution rust inhibitor, in a concentrated form, is to mix at the following ratio 269.5 ml of water (49.9%), 0.5 ml of sodium nitrate (0.1%) and 270.0 ml of potassium sorbate (50.0%). This concentrated rust inhibitor will have a pH of about 10.2. One part of the concentrate should be diluted with 16 parts tap water or deionized water to produce applicant's rust preventive water. This diluted rust preventive water will have about a pH of 6.5.

The PS dosages for rust and corrosion prevention differ from the dosages of PS that are used for the prevention of microbial degradation. PS concentrations are effective as anti-microbial food preservatives, generally in the range of 0.05% to 0.3%. Higher dosages are not used because of the bitter taste that is imparted by PS.

The low concentration of PS currently used in the food industry are not effective for preventing rust, corrosion and/or scale. Concentrations of PS above 0.3% in aqueous systems have been found to be increasingly effective against the rusting, corroding or scaling of metal with a fail-safe concentration of ±1.75% laboratory tested as consistently and indefinitely preventing rust, corrosion and/or scale.

Applicant has found that the PS solution of this invention has reduced conductivity and reduced oxygen content of tap water and believes that this is the technical explanation of how applicant's PS solution functions to prevent rust. Furthermore, the combination of lower conductivity and reduced oxygen content renders the PS solution less viable for microbiological growth. This feature of applicant's PS solution is responsible for eliminating rancidity in re-circulating water systems due to mold. Toxic biocides are often added to re-circulatory water systems to reduce and control microbiological growth. The elimination or reduction of biocides in re-circulatory water systems is an added enhancement of this invention. Furthermore, by substituting the PS solution for tap water in water-based products, such as paints, will also eliminate or reduce the addition of toxic biocides.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DETAILED DESCRIPTION OF THE INVENTION

Figure 1:
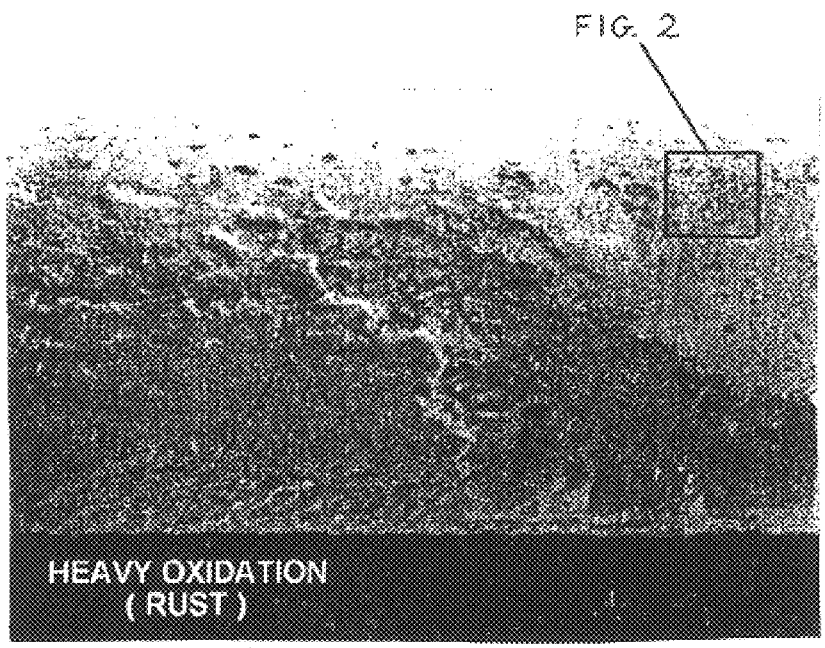
FIG. 1 is an enlarged black and white photograph of a production steel bar that has been exposed to tap water for 7 days.

In accordance with this invention, when PS in the form of powder or granules is dissolved in ordinary tap or deionized water at percentages above 0.3%, this PS aqueous solution will prevent rust, corrosion and scale on metal surfaces.

A visual demonstration of this invention can be produced by immersing an un-galvanized nail in a container of tap water and a similar un-galvanized nail in a container of the PS solution of this invention. The nail in the tap water will begin rusting within hours. However, the nail in the PS solution of this invention will show no signs of rusting.

Another visual demonstration of this invention can be produced by filling a first steel can with tap water and a second steel can with the PS solution of this invention. The inside of the steel can containing tap water will rust rapidly while the other can containing the PS solution of this invention will not rust and will have an unlimited shelf life against rust.

The non-rusting technology of this invention is of great value to manufacturers of water-based products (such as latex paints), as well as the can manufacturers that produce the container for such water-based products. Currently, steel cans made for water-based products are coated, at great expense, to prevent rust.

By substituting the non-rusting PS water solution for the tap water or deionized water now used in the manufacturing of water-based products, the can manufacturer can reduce the expensive coating costs of their products currently used to prevent rust.

Any other water-based product that is packaged in steel cans can use the PS solution and will benefit from similar cost reductions as a result of this PS water solution technology.

Another important use for the PS solution of this invention is in re-circulating water systems. Re-circulating water systems experience various degrees of rust and/or scale. Expensive chemical corrosion inhibitors are added to inhibit this rusting and/or scaling. Re-circulating water systems of the type referred to include, but are not limited to, boilers, cooling towers, heat exchangers, condensers, injection molding machines, etc. Rust, corrosion and scale in all such water re-circulatory systems is prevented when the PS water technology of this invention are used.

The list of industrial, agricultural, commercial and household equipment that experiences rust caused by aqueous solutions is enormous. The McGraw-Hill Encyclopedia of Science and Technology states that the cost, in the United States and other industrial countries, of replacing and protecting equipment against corrosion represents about 4% of the gross national product.

Numerous consumer products can be protected from rust and corrosion by merely immersing and storing them in the PS solution of this invention. Examples of such steel products that currently suffer from rust are razor blades, and fish hooks and lures.

The PS dosages for rust and corrosion prevention differ from the dosages of PS that are used for the prevention of microbial degradation. PS concentrations are effective as anti-microbial food preservatives, generally in the range of 0.05% to 0.3%. Higher dosages are not used because of the bitter taste that is imparted by PS.

The low concentration of PS currently used in the food industry is not effective for preventing rust, corrosion and/or scale. Concentrations of PS above 0.3% in aqueous systems have been found to be increasingly effective against the rusting, corroding or scaling of metal with a fail-safe concentration of ±1.75% laboratory tested as consistently and indefinitely preventing rust, corrosion and/or scale.

Samples of the PS solutions of this invention have been subjected to a continuous lab test by the inventor, as well as being tested by outside testing laboratories. In the outside lab test, 2 ounces of PS, in powder or granular form, was dissolved in one gallon of tap water. The PS will dissolve rapidly in cold or hot tap water or deionized water. The resulting PS solution has a pH in the range of 6.5 to 8.0. The pH of the PS solution depends upon initial pH of the tap or deionized water.

Lowering of the pH of the PS solution, for a particular application, can be achieved by the addition of citric acid. Provided the pH of the PS solution is maintained above 4.5, the non-rusting effectiveness of the PS solution does not significantly change.

Applicant has established through testing that the PS solution of this invention has reduced conductivity and reduced oxygen content both relative to tap water. It is applicant's opinion that this is the technical explanation for the resulting rust prevention. This conclusion is based upon the following test results:

|  | Tap Water | 1.75% PS Water |
|---|---|---|
| Specific Conductivity | 344 umhos/cm | 13,500 umhos/cm at 25% c |
| Dissolved Oxygen | 9.3 mg/l | 7.5 mg/l |

Applicant is not aware of any published literature disclosing this reduction in conductivity and oxygen content at this concentration of PS. 8

When steel products such as rods, sheets and structural beams are produced at a steel mill, an oil coating is applied to prevent rust during shipping. However, this coating soon loses its effectiveness and the products become vulnerable to rust. Also, if the steel products are to be painted or coated in their final use, the oil coating must be completely removed to insure that the paint or coating properly adheres. A serious disadvantage of the protective oil coating is that it contaminates everything that the product comes into contact with. Steel products such as rods, sheets and structural beams can be dipped in or sprayed with applicant's PS solution, and they will not have the disadvantage of contaminating everything that they come into contact with and could be painted or coated without removing the protective coating.

In the test results that are shown in FIGS. 1–4, the steel bars had no protective oil coating before the test began. In this test, plain carbon steel rods, having a diameter of 0.137 inches and 1.75 inches in length, were used. The surfaces of the steel rods were lightly ground and ultrasonically pre-cleaned in ethyl alcohol to remove any organic coatings, dirt debris or inherent oxide films which might interfere with the corrosion test. Some rods were placed in clean glass beakers and covered with plain untreated tap water. Other rods were placed in clean glass beakers and covered with applicant's PS solution. The steel samples and liquid media were maintained at approximately 70° F. for the duration of the test. The test was monitored on a daily basis to ensure that the steel samples maintained a nominal temperature of 70° F. The condition of the samples was noted after 24 hours, 72 hours and at the end of the test period. The procedures and test methods were generally performed in accordance with ASTM Standard G31-72 (1995): "Standard Practice for laboratory Immersion Corrosion Testing of Metals."

At the beginning of the test, the surfaces of all the samples were clean and metallic in appearance. After 24 hours, there was a striking difference between the test samples. The samples that were in tap water were already severely corroded. However, the samples that were in the PS solution still had a clean, shiny metallic appearance. After 72 hours, the differences between the two samples were more pronounced. The test was completed after 7 days. At the end of the test, the samples that had been in tap water were extensively corroded, while the samples that had been in the PS solution still had a clean shine metallic appearance. FIGS. 1–8 illustrate results from this test.

FIG. 1 is an enlarged photograph of the surface of a sample steel bar that has been exposed to tap water for 7 days. There is extensive corrosion present over the surface of the bar.

Figure 2:
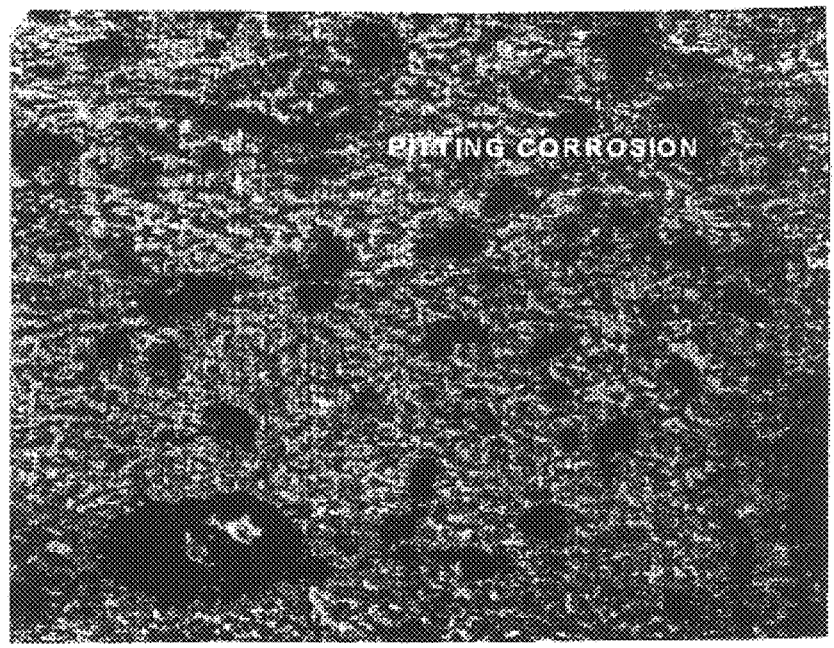
FIG. 2 is a further enlarged black and white photograph of a section of the steel bar seen in FIG. 1.

FIG. 2 is a photograph of a section of the steel bar seen in FIG. 1 that has been further enlarged. A block has been drawn in FIG. 1 indicating the area of FIG. 2. In the area of FIG. 2, the rust had fallen off. The remaining surface is rough and pitted.

Figure 3:
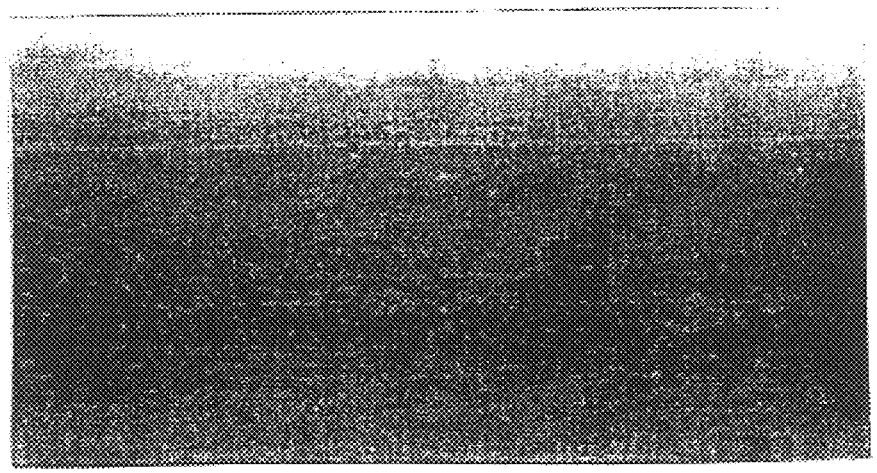
FIG. 3 is an enlarged black and white photograph of a production steel bar that has been exposed to applicant's non rust PS solution for 7 days.

FIG. 3 is an enlarged photograph of the surface of a sample steel bar that has been exposed to applicant's non rust PS solution for 7 days. The enlargement of this photograph corresponds to the enlargement of FIG. 1. There is no corrosion present over the surface of the bar.

Figure 4:
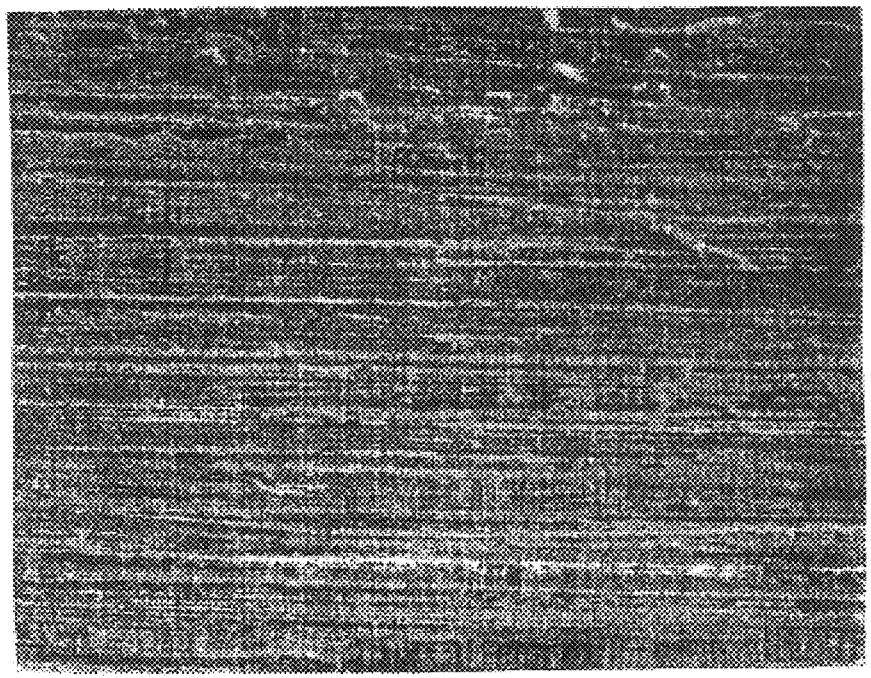
FIG. 4 is a further enlarged black and white photograph of a section of the steel bar seen in FIG. 3.

FIG. 4 is a further enlarged photograph of a section of the steel bar seen in FIG. 3. The enlargement of this photograph corresponds to the enlargement of FIG. 2. Even at this degree of enlargement, there is no corrosion visible on the surface of the bar.

An Energy Dispersive Spectrography (EDS) analysis on the surfaces of samples from both test groups and on the surface of clean, untested steel sample was performed.

Figure 5:
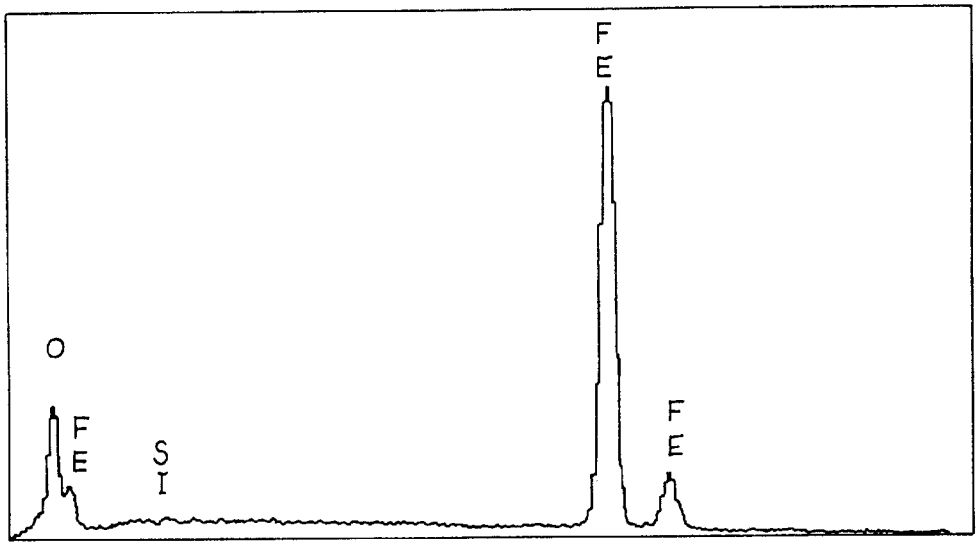
FIG. 5 shows the EDS spectra for the heavy corrosion area of FIG. 1.

FIG. 5 shows the EDS spectra for the heavy corrosion area of FIG. 1, and indicates that it is predominantly iron and oxygen, i.e. iron oxide.

Figure 6:
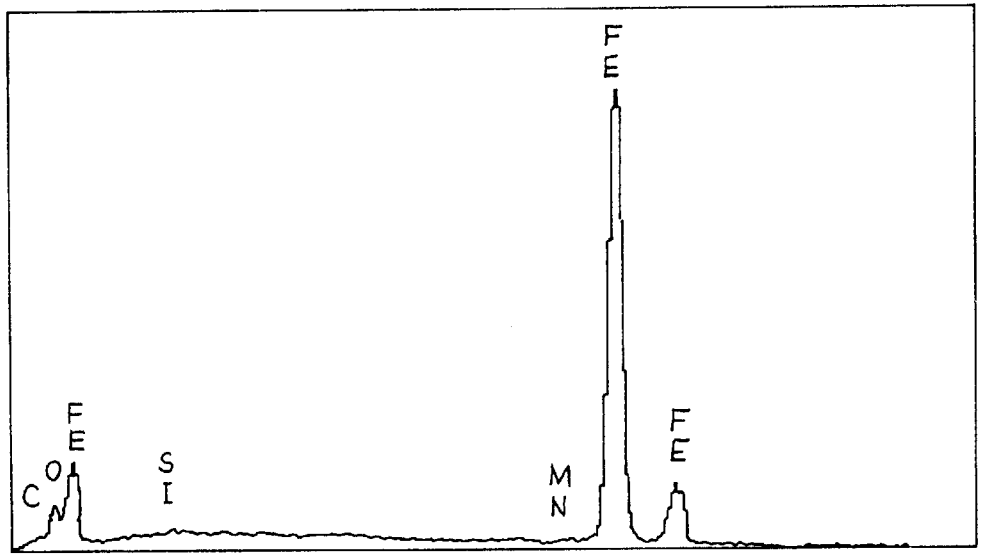
FIG. 6 shows the EDS spectra for the area shown in FIG. 2 where the rust had fallen and the surfaces were pitted.

FIG. 6 shows the EDS spectra for the area shown in FIG. 2 where the rust had fallen off and the surfaces was pitted. Although this area is less oxidized, there is still a significant amount of oxygen present suggesting that the surface was corrosively attacked.

Figure 7:
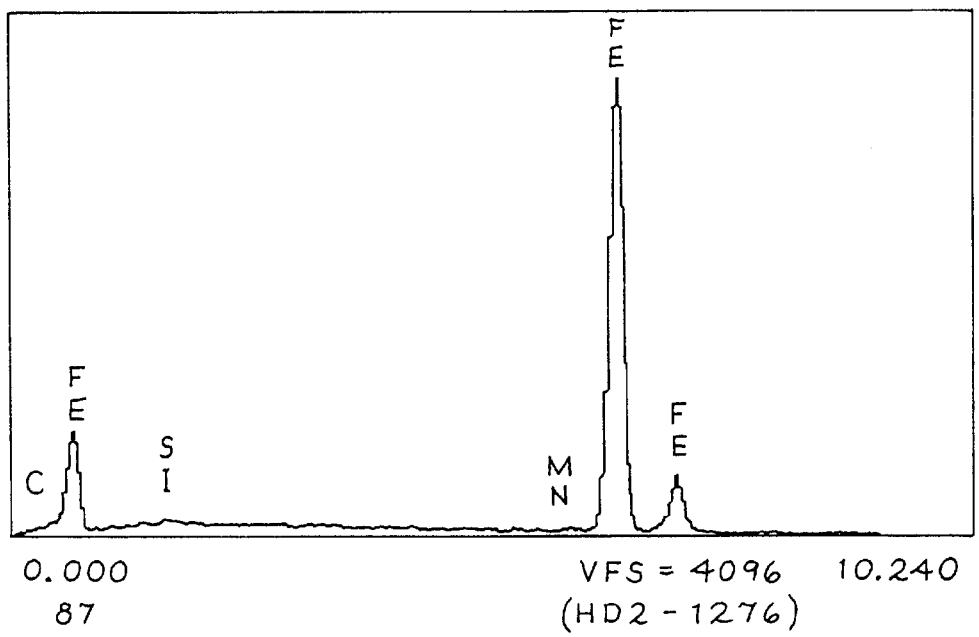
FIG. 7 shows the EDS spectra for the test bar shown in FIGS. 3 and 4.

FIG. 7 shows the EDS spectra for the test bar shown in FIGS. 3 and 4. This bar had been exposed to applicant's PS solution for 7 days. Only iron, manganese, silicon and carbon were detected on the surface of this sample, which are the common elements expected to be found in a low-carbon steel. No oxygen, nitrogen or other elements indicative of surface corrosion were found on the surface of this test sample.

Figure 8:
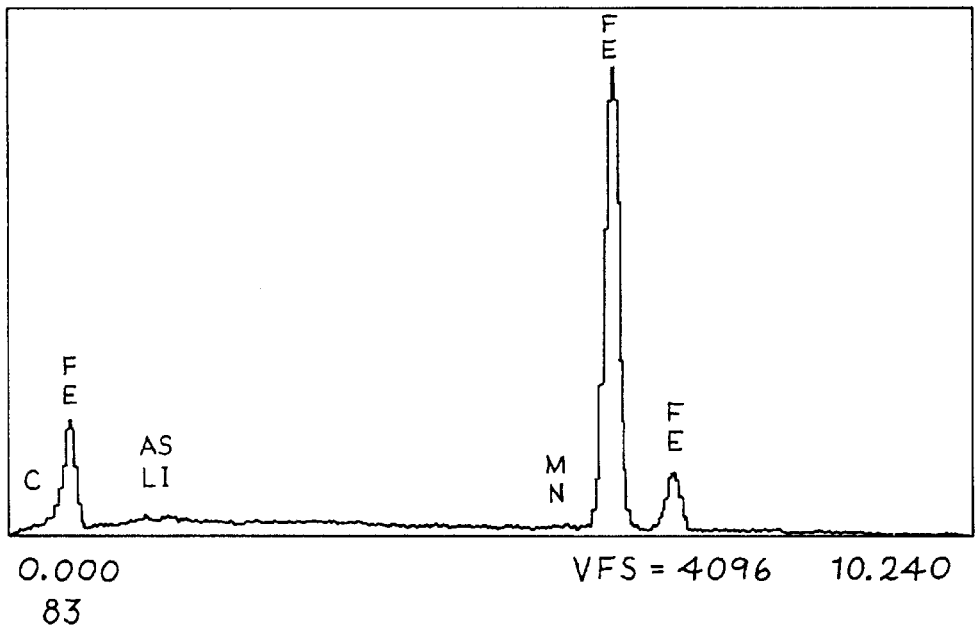
FIG. 8 shows the EDS spectra for a sample test bar that had not been exposed to the corrosion test.

FIG. 8 shows the EDS spectra for a sample bar that had not been exposed to the corrosion test. This test was performed for comparative purposes. Other than a slight amount of aluminum present on this surface, it is identical to the steel bar sample which had been exposed to the PS solution and shown in FIG. 7. The aluminum on the surface of this sample is probably a residue from the grinding paper used to clean its surface before examination.

FIGS. 9–17 are color photographs of a test that was conducted over a seven-day period. This test is similar to the test that is shown and discussed with reference to FIGS. 1–8. However, in each of FIGS. 9–17, the test specimens and the liquid that they are being exposed to are shown side-by-side. The rust on the specimens that are being exposed to the tap water becomes very apparent as the test progresses. The rust is not only visible on the specimens, but also in the tap water which becomes discolored by the rust.

Figure 9:
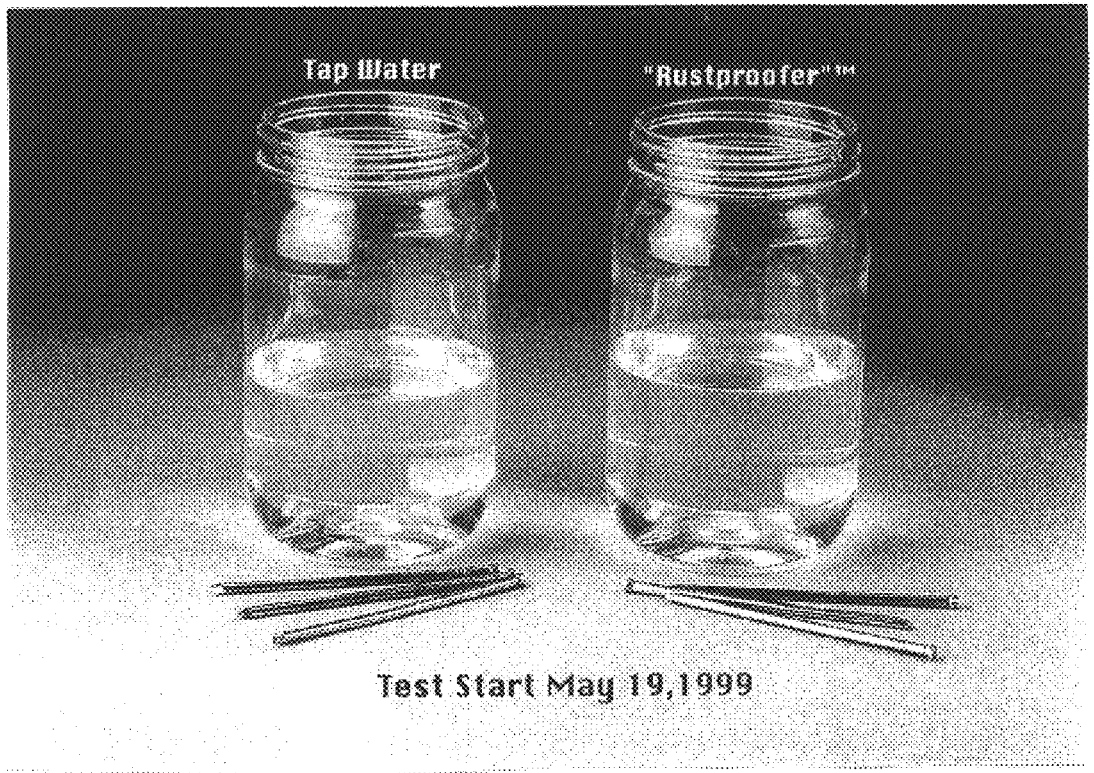
FIG. 9 is a color photograph of the test samples and containers of the test solution prior to the start of an Immersion Corrosion Test.

FIG. 9 is a color photograph of the test specimens prior to being exposed to the liquid. The test specimens are un-galvanized nails. The left beaker contains tap water and the right beaker contains applicant's PS solution which is labeled "Rustproofer"™, which is the trademark that applicant is contemplating using for his PS solution. In this Figure, all test specimens are clean and metallic in appearance and the liquids are clear and have no discoloration.

Figure 10:
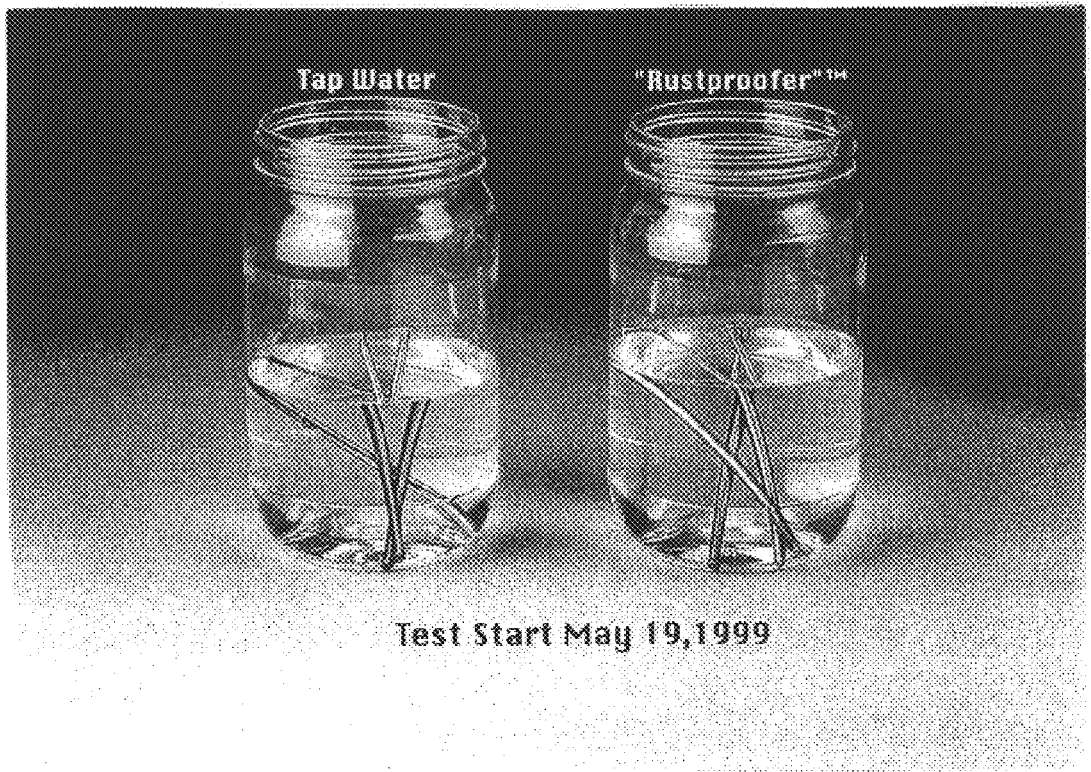
FIG. 10 is a color photograph of the test samples in the test solutions at the beginning of the Immersion Corrosion Test.

FIG. 10 is a color photograph of the test specimens in the liquids. This color photograph was taken immediately after the specimens were placed in the beakers containing the liquids. In this Figure, all test specimens are clean and metallic in appearance and the liquids are clear with no discoloration.

Figure 11:
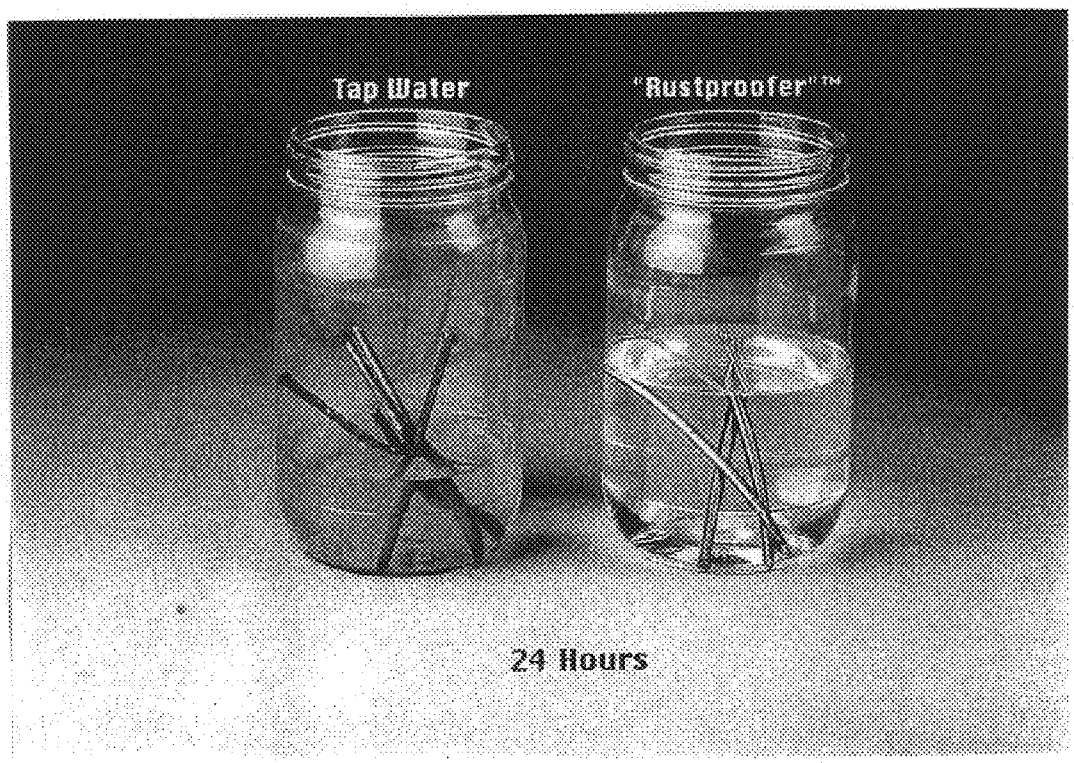
FIG. 11 is a side view color photograph of the test samples in the test solution taken 24 hours after the beginning of the test.

FIG. 11 is a front view color photograph of the test specimens in the liquids taken 24 hours after the test was started. In this Figure, the tap water in the beaker to the left shows some discoloration and the test specimens in this beaker show some evidence of rust. In this Figure, the PS solution in the beaker to the right is clear with no discoloration and the test specimens in this beaker remain clean and metallic in appearance.

Figure 12:
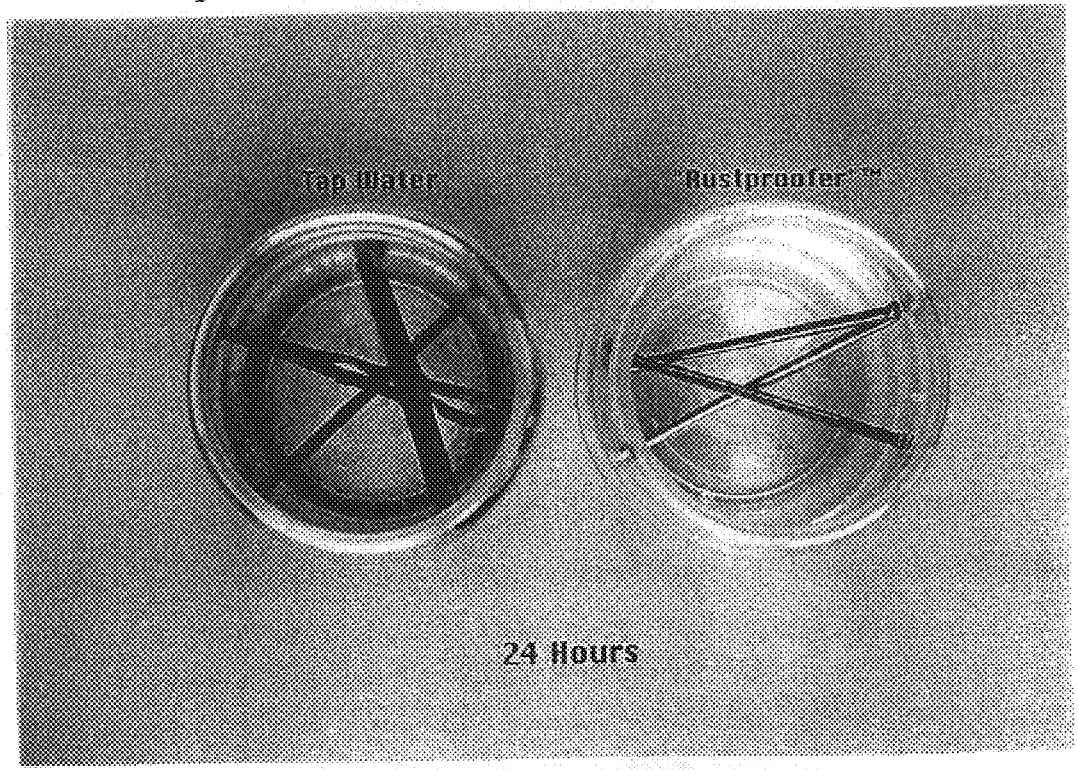
FIG. 12 is a top view color photograph of the test samples in the test solution taken 24 hours after the beginning of the test.

FIG. 12 is a top view color photograph of the test specimens in the liquids taken 24 hours after the test was started. In this Figure, the tap water in the beaker to the left shows some discoloration and the test specimens in this beaker show some evidence of rust. In this Figure, the PS solution in the beaker to the right is clear with no discoloration and the test specimens in this beaker remain clean and metallic in appearance.

Figure 13:
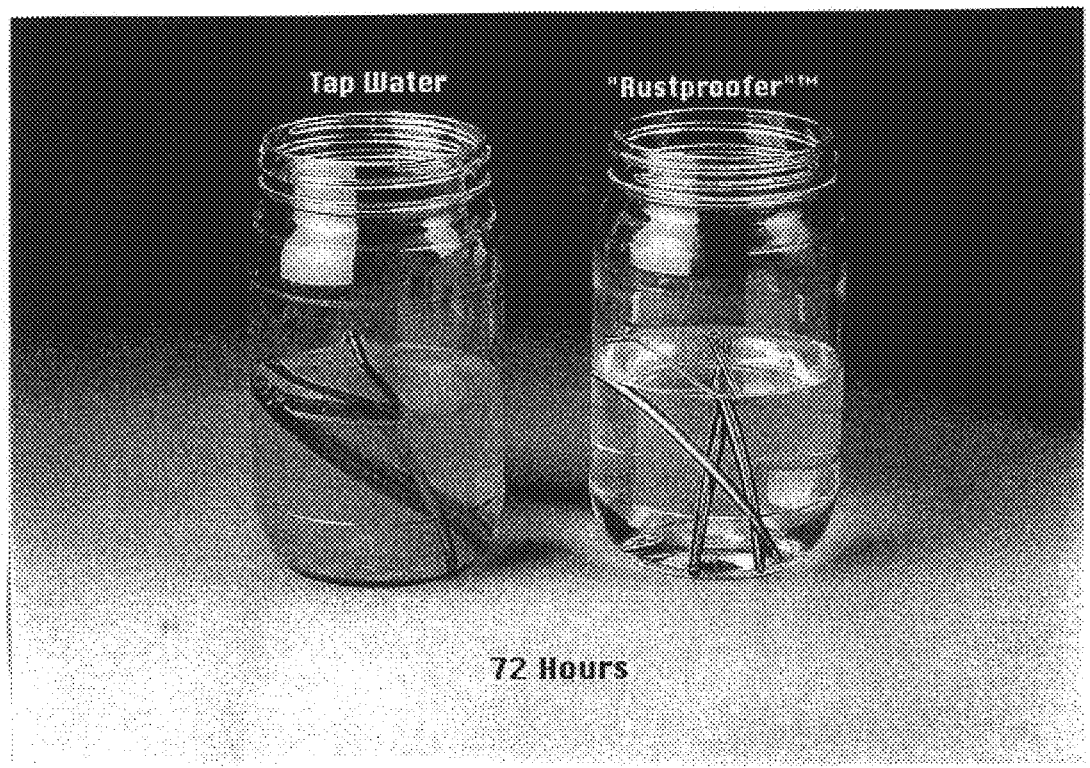
FIG. 13 is a side view color photograph of the test samples in the test solution taken 72 hours after the beginning of the test.

FIG. 13 is a front view color photograph of the test specimens in the liquids taken 72 hours after the test was started. In this Figure, the tap water in the beaker to the left clearly shows discoloration and the test specimens in this beaker show some evidence of rust. In this Figure, the PS solution in the beaker to the right is clear with no discoloration and the test specimens in this beaker remain clean and metallic in appearance.

Figure 14:
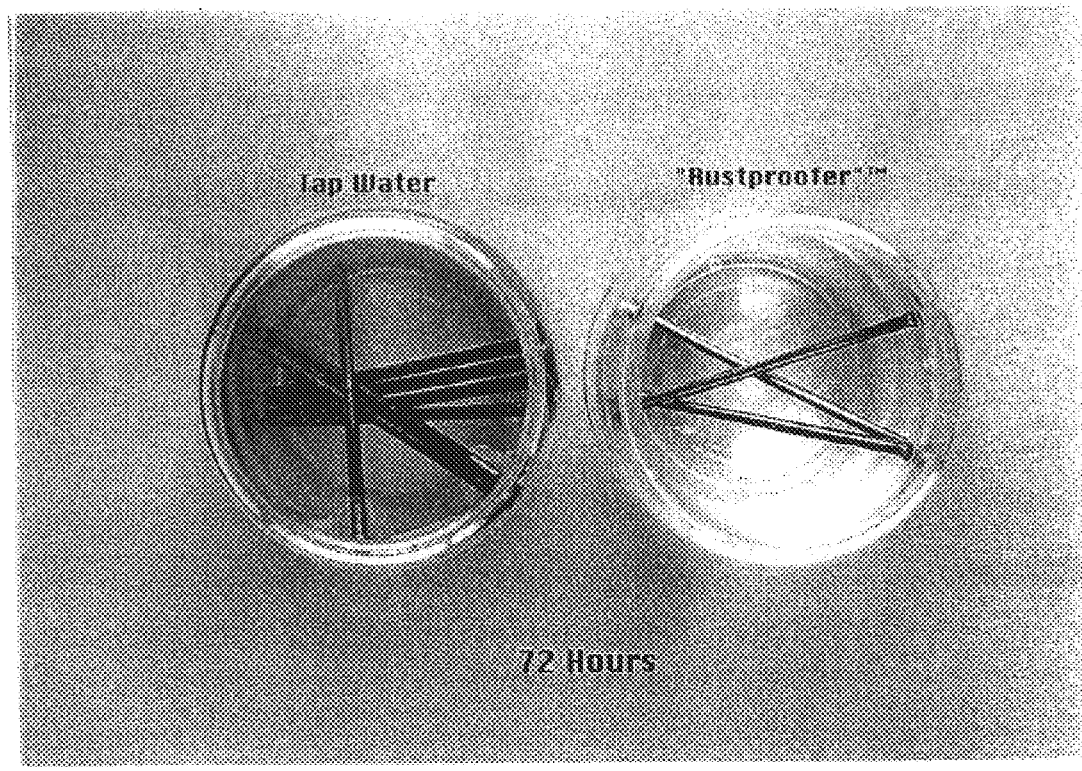
FIG. 14 is a top view color photograph of the test samples in the test solution taken 72 hours after the beginning of the test.

FIG. 14 is a top view color photograph of the test specimens in the liquids taken 72 hours after the test was started. In this Figure, the tap water in the beaker to the left clearly shows discoloration and the test specimens in this beaker show some evidence of rust. In this Figure, the PS solution in the beaker to the right is clear with no discoloration and the test specimens in this beaker remain clean and metallic in appearance.

Figure 15:
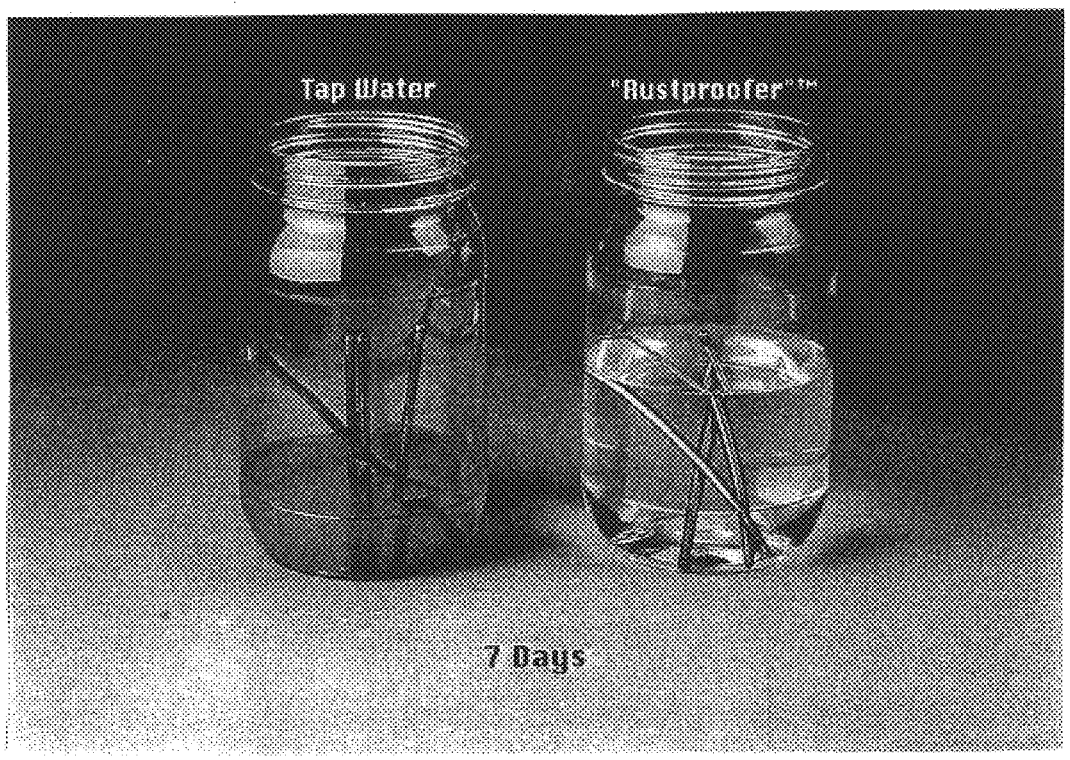
FIG. 15 is a side view color photograph of the test samples in the test solution taken 7 days after the beginning of the test.

FIG. 15 is a front view color photograph of the test specimens in the liquids taken 7 days after the test was started. In this Figure, the tap water in the beaker to the left is discolored and the test specimens in this beaker clearly show evidence of rust. In this Figure, the PS solution in the beaker to the right is clear with no discoloration and the test specimens in this beaker remain clean and metallic in appearance.

Figure 16:
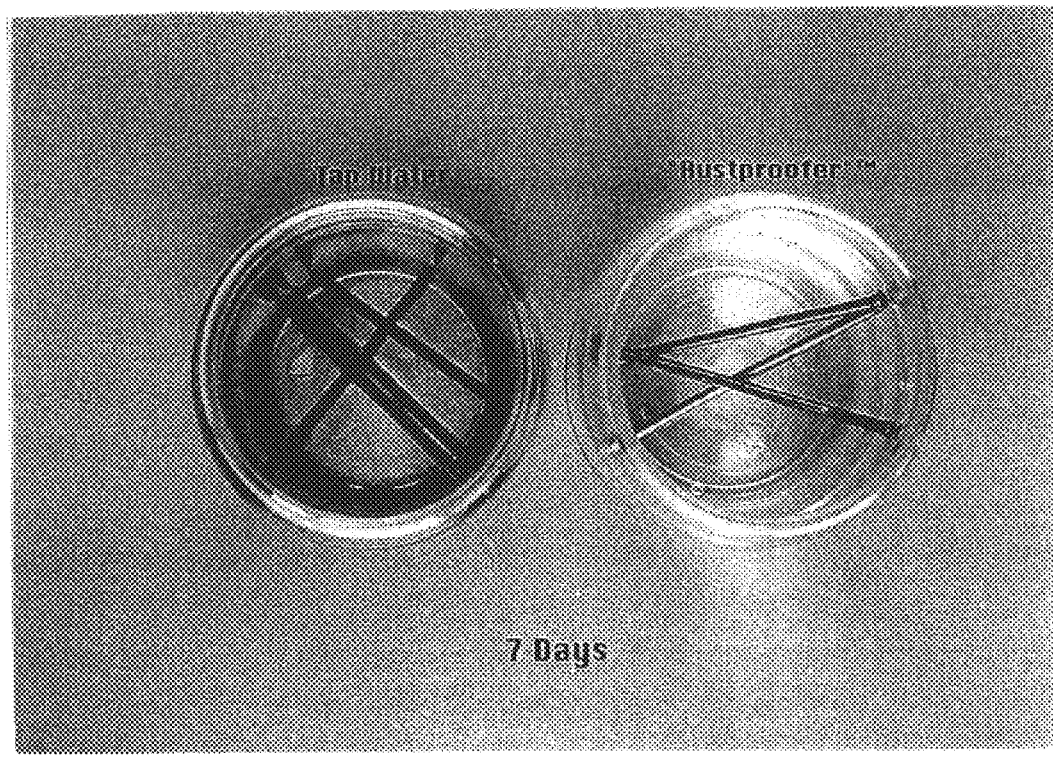
FIG. 16 is a top view color photograph of the test samples in the test solution taken 7 days after the beginning of the test.

FIG. 16 is a top view color photograph of the test specimens in the liquids taken 7 days after the test was started. In this Figure, the tap water in the beaker to the left shows discoloration and a circle of rust residue can be seen on the bottom of the beaker. The test specimens in this beaker clearly show evidence of rust. In this Figure, the PS solution in the beaker to the right is clear with no discoloration and the test specimens in this beaker remain clean and metallic in appearance.

Figure 17:
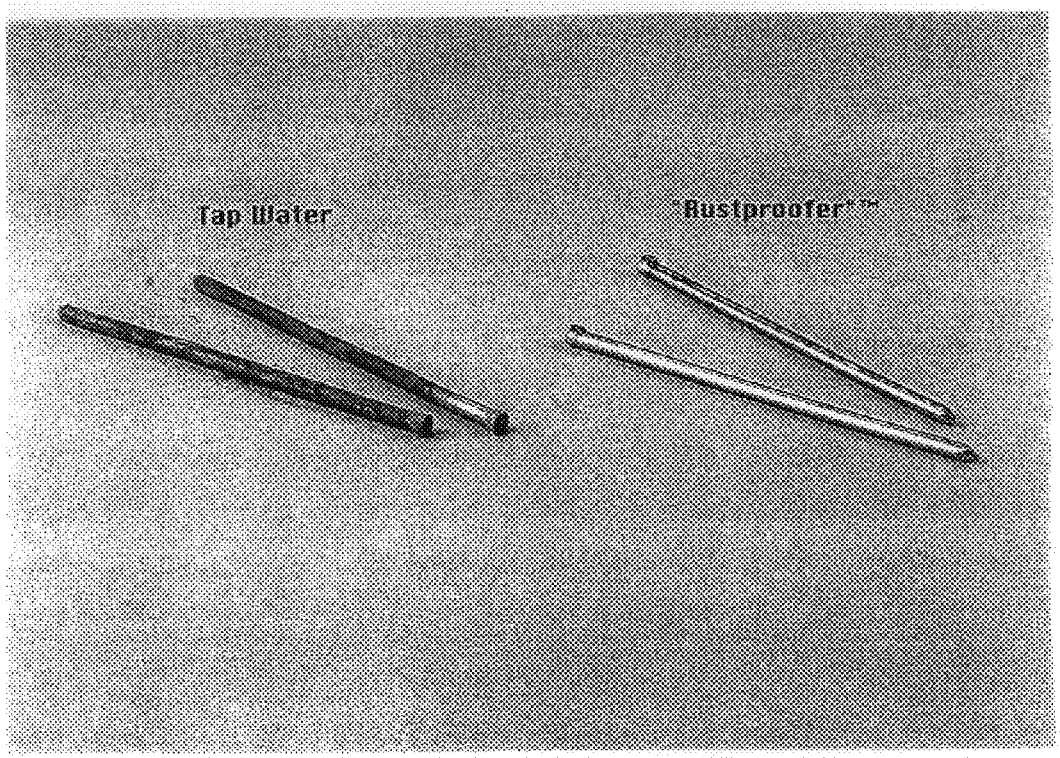
FIG. 17 is a color photograph of the test samples after being removed from the Immersion Corrosion Test after the 7-day exposure.

FIG. 17 is a perspective view color photograph of the test specimens after having been removed from the beakers at the end of the test. The specimens that were in the tap water are on the left side and the specimens that were in the PS solution are on the right side. In this Figure, the specimens that were exposed to tap water have rust on their surfaces and the specimens that were exposed to the PS solution have no rust. If the specimens on the right in FIG. 17 are compared to the specimens before the test commenced, as seen in FIG. 9, there has been no visible deterioration of the specimens as a result of being exposed to the PS solution for 7 days. After 7 days of exposure to the PS solution, the specimens are clean and metallic in appearance.

The foregoing specification describes only preferred embodiments of the invention as shown. Other embodiments may be articulated as well. The terms and expressions, therefore, serve only to describe the invention by example only and not to limit the invention. It is expected that others perceive differences which, while differing from the foregoing, do not depart from the spirit and scope of the invention herein described and claimed.

What is claimed is:

1. A concentrated form of aqueous solution that, when diluted with 16 parts of tap water or deionized water, prevents the formation of rust, corrosion and scale on metal surfaces that is exposed to it consisting of a solution formed in accordance with the following ratio of ingredients:

269.5 milliliters of tap or deionized water;

0.5 milliliters of sodium nitrate; and 270.0 milliliters of potassium sorbate.

2. The method of producing a concentrated form of aqueous solution for use as a rust preventor consisting of the steps of:

a) providing 269.5 milliliters of tap or deionized water to a mixing container;

b) adding 0.5 milliliters of sodium nitrate to the mixing container;

c) adding 270.0 milliliters of potassium sorbate to the mixing container; and d) mixing the contents of the mixing container.

3. The method of producing an aqueous solution for use as a rust preventor consisting of the steps of:

a) providing a multiple of 269.5 milliliters of tap or deionized water to a mixing container;

b) adding 0.5 milliliters, multiplied by the same multiple, of sodium nitrate to the mixing container;

c) adding 270.0 milliliters, multiplied by the same multiple, of potassium sorbate to the mixing container; and d) diluting one part of a concentrate of the contents of the mixing container with 16 parts of tap or deionized water.

* * * * *

UNITED STATES PATENT AND TRADEMARK OFFICE
CERTIFICATE OF CORRECTION

PATENT NO. : 6,500,360 B2
DATED : December 31, 2002
INVENTOR(S) : Bernard Bendiner It is certified that error appears in the above-identified patent and that said Letters Patent is hereby corrected as shown below:

Column 2,
Line 44, before "conductivity" delete "reduced" and substitute -- increased -- in its place.
Line 47, before "conductivity" delete "lower" and substitute -- higher -- in its place.

Column 4,
Line 66, before "conductivity" delete "reduced" and substitute -- increased -- in its place.

Column 5,
Line 12, delete "reduction" and substitute -- increase -- in its place.
Line 13, after "PS." delete "8".

Signed and Sealed this

Second Day of December, 2003

JAMES E. ROGAN
*Director of the United States Patent and Trademark Office*